US009256755B2

(12) United States Patent
Nicolaou

(10) Patent No.: US 9,256,755 B2
(45) Date of Patent: Feb. 9, 2016

(54) NOTIFICATION OF APPLICATION PERMISSIONS

(71) Applicant: Google Inc., Mountain View, CA (US)

(72) Inventor: Alexander Nicolaou, Waterloo (CA)

(73) Assignee: Google Inc., Mountain View, CA (US)

( * ) Notice: Subject to any disclaimer, the term of this patent is extended or adjusted under 35 U.S.C. 154(b) by 12 days.

(21) Appl. No.: 14/145,644

(22) Filed: Dec. 31, 2013

(65) Prior Publication Data
US 2015/0186664 A1  Jul. 2, 2015

(51) Int. Cl.
G06F 21/00 (2013.01)
G06F 21/62 (2013.01)

(52) U.S. Cl.
CPC .................. G06F 21/6209 (2013.01)

(58) Field of Classification Search
USPC .................. 726/2, 4; 713/156, 168, 170, 176
See application file for complete search history.

(56) References Cited

U.S. PATENT DOCUMENTS

| 2006/0053426 | A1 | 3/2006 | Dive-Reclus et al. | |
| 2007/0055871 | A1 | 3/2007 | Ghanea-Hercock | |
| 2007/0074034 | A1* | 3/2007 | Adams et al. ................. | 713/176 |
| 2010/0242097 | A1 | 9/2010 | Hotes et al. | |
| 2013/0160147 | A1 | 6/2013 | Draluk et al. | |
| 2013/0232540 | A1 | 9/2013 | Saidi et al. | |
| 2013/0263260 | A1 | 10/2013 | Mahaffey et al. | |
| 2013/0347064 | A1 | 12/2013 | Aissi | |
| 2014/0122329 | A1 | 5/2014 | Naggar et al. | |
| 2015/0121083 | A1* | 4/2015 | Zhang ..................... | G06F 21/00 713/176 |

FOREIGN PATENT DOCUMENTS

WO    WO-2011/075281 A1    6/2011

OTHER PUBLICATIONS

Jaeyeon Jung, Anmol Sheth, Sunny Convolso, Ben Breenstein, Anthony LaMarca and David Weheral, "Taking the Mystery Out of Sensing Devices in the Home", May 18, 2010, Intel Labs Seattle, University of Washington, Citeseer.*

Enck, "On Lightwweight Mobile Phone Application Certification," Oct. 2011, Systems and Internet Infrastructure Security Laboratory, Department of Computer Science and Engineering, The Pennsylvania State University, retrieved from http://web.archive.org/web/20111027083518/http://www.enck.org/pubs/ccs09-enck.pdf.

Felt, "The Effectiveness of Application Permissions", May 2011,University of California, Berkeley, retrieved from http://web.archive.org/web/*/http://www.cs.berkeley.edu/~daw.papers/perms-wabapps11.pdf.

* cited by examiner

Primary Examiner — Joseph P Hirl
Assistant Examiner — Chi Nguy
(74) Attorney, Agent, or Firm — McDermott Will & Emery LLP

(57) ABSTRACT

Methods, systems, and computer-readable media for granting application permissions and providing notifications of API activity are provided. An example method may include receiving a first API call by an installed application. The method may further include determining a sensitivity level of the received first API call. The method may further include when the determined sensitivity level of the received first API call is associated with a restricted API classification, determining whether an author of the installed application is an authorized author, and when the author of the installed application is determined to be an authorized author, allowing the received first API call access to its associated API. An example system may include instructions that, when executed by the one or more processors, cause the one or more processors to detect an API call by an application, the API call for accessing data associated with a computing device, determine a sensitivity level of the API call based on the associated data, and provide an indication of the API call based on the determined sensitivity level.

8 Claims, 7 Drawing Sheets

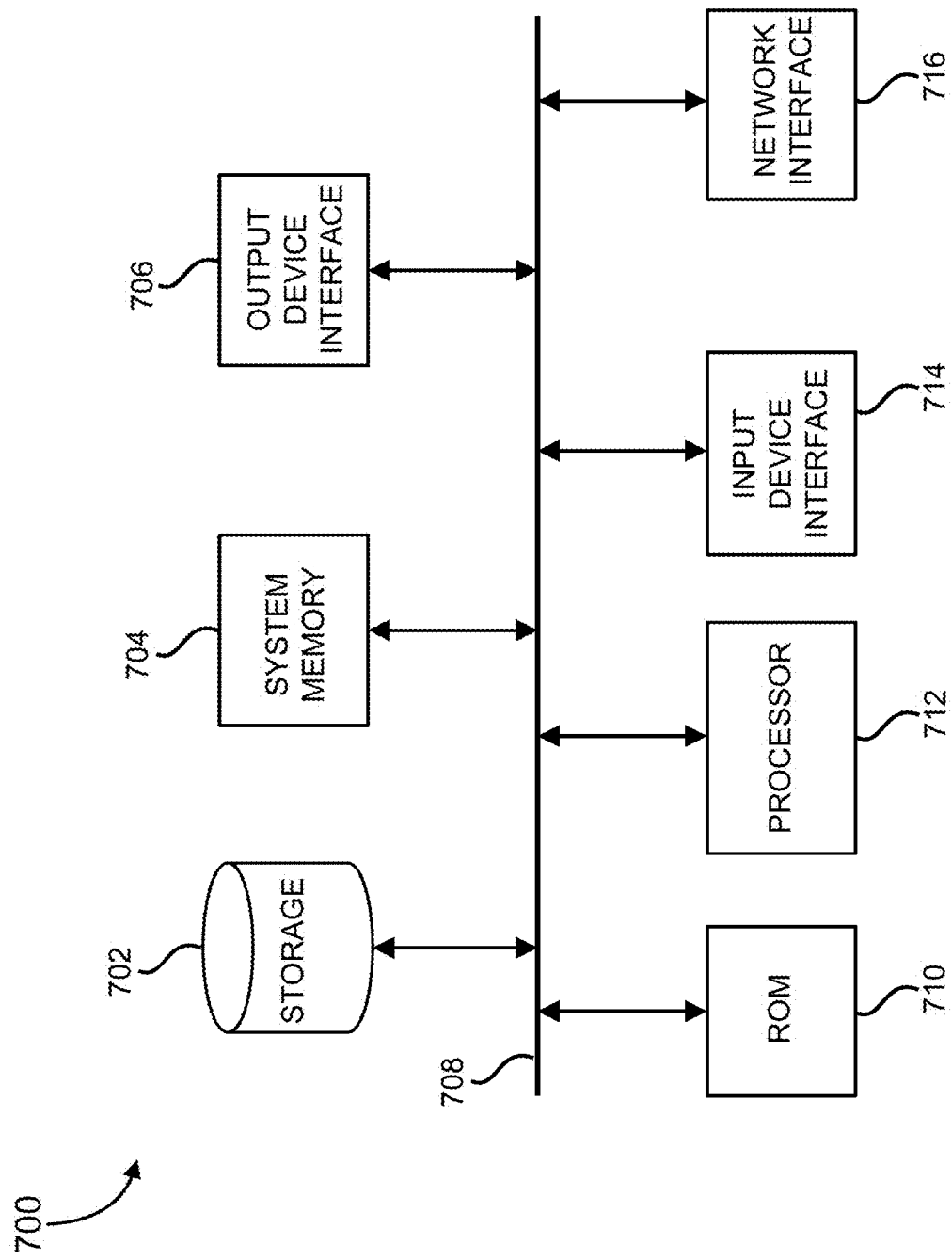

NOTIFICATION OF APPLICATION PERMISSIONS

BACKGROUND

Security models for applications typically involve showing a user some kind of a dialog at the time of installation of the application. The user may be provided an opportunity to review various access permissions and accept them. After such user acceptance, the installed application generally has access to a set of application programming interfaces (APIs) on a going forward basis. Certain APIs, to which the installed application has access, may relate to the user's sensitive data or information.

SUMMARY

The present disclosure relates generally application permissions and data security, and more particularly to techniques related to granting application permissions and providing notifications of API activity.

The disclosed subject technology relates to computer-implemented methods for granting application permissions during installation, allowing API calls based on authorization of an author of an application, and providing notifications of API activity. It is to be understood that various implementations of the subject technology may include any, all, or none of the following features. An example method may comprise processing a request to install an application that requires access to one or more application programming interfaces (APIs) by the application. The method may further comprise determining a sensitivity level of each of the one or more required APIs. In addition, the method may comprise when the determined sensitivity level of at least one API of the one or more required APIs is associated with a restricted API classification, requiring that code of the application be delivered using a secure mechanism.

Another example computer-implemented method may comprise receiving a first application programming interface (API) call by an installed application. The method may further comprise determining a sensitivity level of the received first API call. The method may further comprise when the determined sensitivity level of the received first API call is associated with a restricted API classification, determining whether an author of the installed application is an authorized author. In addition, the method may comprise when the author of the installed application is determined to be an authorized author, allowing the received first API call access to its associated API.

Another example computer-implemented method may comprise processing a request to install an application that requires one or more application programming interface (API) calls by the application. The method may further comprise determining an authoring entity of the application. The method may further comprise determining whether the authoring entity is certified by one or more trusted entities. In addition, the method may comprise allowing an installation of the application when the authoring entity is certified by at least one trusted entity of the one or more trusted entities.

Another example computer-implemented method may comprise detecting an API call by an application, the API call for accessing data associated with a computing device. The method may further comprise determining a sensitivity level of the API call based on the associated data. In addition, the method may comprise providing an indication of the API call based on the determined sensitivity level.

The disclosed subject matter further relates to systems for granting application permissions during installation, allowing API calls based on authorization of an author of an application, and providing notifications of API activity. An example system may comprise one or more processors, and a memory including instructions that, when executed by the one or more processors, cause the one or more processors to perform operations. The one or more processors of the system may be configured to process a request to install an application that requires access to one or more application programming interfaces (APIs) by the application. The one or more processors of the system may be further configured to determine a sensitivity level of each of the one or more required APIs. In addition, the one or more processors of the system may be configured to when the determined sensitivity level of at least one API of the one or more required APIs is associated with a restricted API classification, require that code of the application be delivered using a secure mechanism.

Another example system may comprise one or more processors configured to receive a first application programming interface (API) call by an installed application. The one or more processors of the system may be further configured to determine a sensitivity level of the received first API call. The one or more processors of the system may be further configured to when the determined sensitivity level of the received first API call is associated with a restricted API classification, determine whether an author of the installed application is an authorized author. In addition, the one or more processors of the system may be configured to when the author of the installed application is determined to be an authorized author, allowing the received first API call access to its associated API.

Another example system may comprise one or more processors configured to process a request to install an application that requires one or more application programming interface (API) calls by the application. The one or more processors of the system may be further configured to determine an authoring entity of the application. The one or more processors of the system may be further configured to determine whether the authoring entity is certified by one or more trusted entities. In addition, the one or more processors of the system may be configured to allow an installation of the application when the authoring entity is certified by at least one trusted entity of the one or more trusted entities.

Another example system may comprise one or more processors configured to detect an API call by an application, the API call for accessing data associated with a computing device. The one or more processors of the system may be further configured to determine a sensitivity level of the API call based on the associated data. In addition, the one or more processors of the system may be configured to provide an indication of the API call based on the determined sensitivity level.

The disclosed subject matter also relates to example machine-readable media comprising instructions stored therein, which when executed by a system, cause the system to perform operations for granting application permissions during installation, allowing API calls based on authorization of an author of an application, and providing notifications of API activity. An example machine-readable medium may comprise instructions for processing a request to install an application that requires access to one or more application programming interfaces (APIs) by the application. The machine-readable medium may further comprise instructions for determining a sensitivity level of each of the one or more required APIs. In addition, the machine-readable medium may comprise instructions for requiring, when the determined sensitivity level of at least one API of the one or more required APIs is associated with a restricted API classification, that code of the application be delivered using a secure mechanism.

Another example machine-readable medium may comprise instructions for receiving a first application programming interface (API) call by an installed application. The machine-readable medium may comprise instructions for determining a sensitivity level of the received first API call. The machine-readable medium may comprise instructions for determining, when the determined sensitivity level of the received first API call is associated with a restricted API classification, whether an author of the installed application is an authorized author. In addition, The machine-readable medium may comprise instructions for allowing, when the author of the installed application is determined to be an authorized author, the received first API call access to its associated API.

Another example machine-readable medium may comprise instructions for processing a request to install an application that requires one or more application programming interface (API) calls by the application. The machine-readable medium may comprise instructions for determining an authoring entity of the application. The machine-readable medium may comprise instructions for determining whether the authoring entity is certified by one or more trusted entities. In addition, The machine-readable medium may comprise instructions for allowing an installation of the application when the authoring entity is certified by at least one trusted entity of the one or more trusted entities.

Another example machine-readable medium may comprise instructions for detecting an API call by an application, the API call for accessing data associated with a computing device. The machine-readable medium may comprise instructions for determining a sensitivity level of the API call based on the associated data. In addition, The machine-readable medium may comprise instructions for providing an indication of the API call based on the determined sensitivity level.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

FIG. 7 conceptually illustrates an electronic system with which some aspects of the subject technology are implemented.

DETAILED DESCRIPTION

Figure 1:
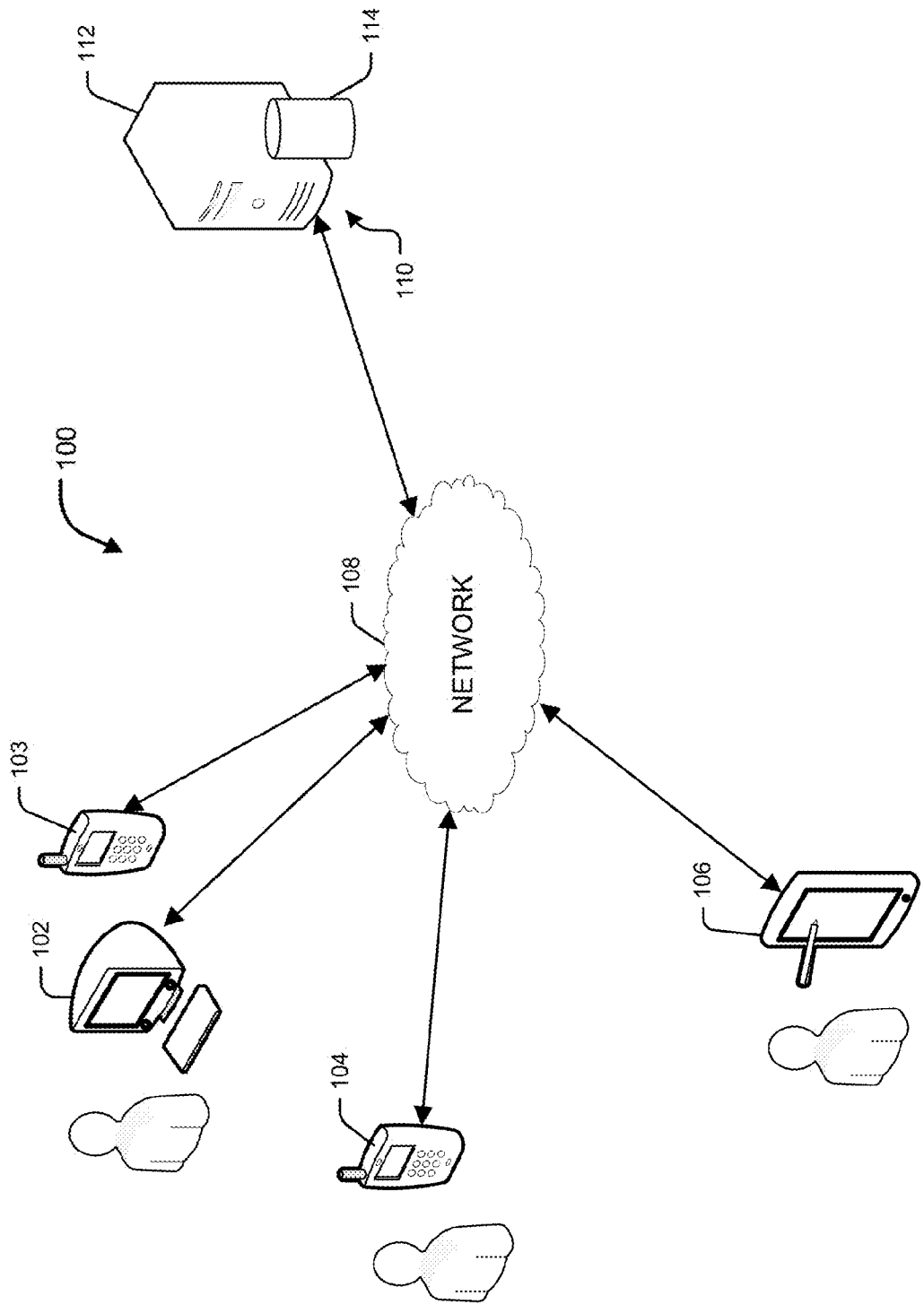
FIG. 1 illustrates an example client-server network environment which provides for application permissions in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

In accordance with various aspects of the subject technology, the present disclosure describes techniques for managing application permissions and indicating API call activity. For example, many users have relatively low awareness regarding the application permissions to which they are agreeing at the time of downloading and installing an application. Users likewise have little visibility to these application permissions and any problems that may be caused by the installed application, particularly when a large number of applications are downloaded to a device, for example.

Accordingly, in certain examples, techniques for granting and managing application permissions for an application at installation and during use of the application are described herein. These techniques may be used individually to improve security to a user's information and awareness of what information is being access and by whom. However, the techniques may be used in combination to provide an applications permissions management scheme and information access visibility.

In some examples, a mobile device may receive a request to install (or send a request to download) an application that requires access to one or more APIs. The sensitivity level of the API associated with the application may be determined, and when the sensitivity level of the API call is determined to be of a sensitive or restricted nature, the mobile device may require that the code of the application be delivered using a secure mechanism that identifies the author.

For example, delivery using secure sockets layer (SSL) protocol and SSL certificate may be required. SSL protocol technology may be used as the secure mechanism to enable two systems to communicate via encrypted data. The receiving system has the ability to certify that the received data was indeed transmitted from the source that is claiming to deliver it.

In other examples, for instance, when an application has previously been installed on the mobile device, the mobile device may receive an API call from the application. The mobile device may then determine whether the received API call is a sensitive or restricted API call. If it is determined that the received API call is a sensitive or restricted API call, then the received API call may only be allowed if the author of the installed application is an authorized author.

Whether the author of the installed application is an authorized author may be determined by determining whether a certificate associated with delivery of code during the installation of the application is owned by a trusted entity or has been validated by a trusted entity. A trusted entity may be a corporate entity or an individual user in accordance with various examples and implementations.

A trusted entity approach to granting application permissions may be further employed, for example, when a device processes a request to install an application that requires one or more API calls. For example, a user of the device may wish to initiate a download of an application from a remote server, but may not be knowledgeable of who the author of the application is or the author's credentials, for example. Accordingly, an authoring entity of the application may be determined, and if the authoring entity is certified by one or more trusted entities, the device may allow the download and installation of the application requires one or more API calls.

In this regard, rather than having approval of API permissions be made on an application by application basis, a user of a device in accordance with the subject technology can indicate trust of a trusted entity. Accordingly, each of a plurality of trusted entities can serve to identify a plurality of authors that are permitted provide applications to users.

In other examples, techniques for providing indications and detailed notifications to a user of a device regarding API calls being invoked may be provided. For example, a device may provide a user with a real-time indication that an API call or other information access request is taking place. In an example, a user of the device may be running an application, for instance, a racing game, when a sensitive or restricted API call that is not expected by the user is triggered by the application. For example, the racing game application may invoke an API call associated with the access of the user's financial data stored on the device.

In response to the sensitive or restricted API call, the device may provide an indication that the sensitive or restricted API call has just occurred. For example, the device may activate an API access indicator light position somewhere on the phone housing or an API access indicator icon positioned on a display screen of the device. For example, the indicator light and/or indicator icon may illuminate, flash, blink, or pulse different colors (e.g., red, yellow, or green) for different durations based on the level of sensitivity associated with the API call.

In yet other examples, an API access log can be provided as a notification log viewable on the display screen of the device. The API access log may be dedicated to providing only API access notifications in some implementations. For example, the API access log can include entries providing information such as application name, level of sensitivity, details, time, etc., related to API access events that have occurred on the device. In some implementations, the API access log can be launched from an API access indicator icon positioned on a display screen of the device.

To this end, real-time indication of API access may be communicated along with notification details regarding the level of sensitivity of the detected API call such that a user of a device in accordance with the subject technology can readily correlate a sensitive or restricted API to an application being currently executed by the device.

Systems and techniques for granting application permissions and providing notifications of API activity in accordance with various aspects of the subject technology are described in further detail below.

FIG. 1 illustrates an example client-server network environment which may support application permissions and be used to implement various techniques for granting or denying permissions. Network environment 100 may include a number of electronic devices 102, 103, 104, 106 communicably connected to one or more servers 110, such as by network 108. In other examples, electronic devices 102, 103, 104, 106 may be communicably connected to one another, such as by network 108, but not communicably connected to one or more servers 110.

In the example of FIG. 1, one or more server 110 may host one or more systems or services including but not limited to systems for downloading and installing based on application permissions techniques. In certain examples, each of one or more servers 110 may be a single computing device such as a computer server. In other examples, one or more servers 110 may represent more than one computing device working together to perform the actions of a server computer (e.g., a cloud of computers or a distributed system). In another example, each of one or more servers 110 may be coupled with various databases, storage services, or other computing devices. Each of one or more servers 110 and the coupled databases, storage services, or other computing devices may be collocated, or may be disparately located.

For example, each of one or more servers 110 may include one or more processing devices 112 and one or more data stores 114. One or more processing devices 112 may execute instructions stored in one or more data stores 114. One or more data stores 114 may store the computer instructions on non-transitory computer-readable medium.

Network 108 may be a public communication network, a private communications network, or a combination of both. In certain examples, network 108 can include any one or more of a personal area network (PAN), a local area network (LAN), a campus area network (CAN), a metropolitan area network (MAN), a wide area network (WAN), a broadband network (BBN), the Internet, and the like. Further, network 108 can include, but is not limited to, any one or more of the following network topologies, including a bus network, a star network, a ring network, a mesh network, a star-bus network, tree or hierarchical network, and the like.

Network 108 may be a public communication network (including, but not limited to, the Internet, cellular data network, cable data network, or dialup modems over a public switched telephone network) or a private communications network (such as, for example, private local area network ("LAN") or leased-line network). Network 108 may also include, but is not limited to, any one or more of the following network topologies, including a bus network, a star network, a ring network, a mesh network, a star-bus network, a tree or hierarchical network, and the like.

In some implementations, electronic devices 102, 103, 104 and 106 can be computing devices such as laptop or desktop computers, smartphones, personal digital assistants ("PDAs"), portable media players, tablet computers, televisions or other displays with one or more processors coupled thereto or embedded therein, or other appropriate computing devices. In the example of FIG. 1, electronic device 102 is depicted as a desktop computer, electronic devices 103, 104 are depicted as smartphones, and electronic device 106 is depicted as a tablet device.

Communications between electronic devices 102, 103, 104, 106, and server 110 may be facilitated utilizing various file sharing techniques and data transmission protocols such as, but not limited to, Hypertext Transfer Protocol (HTTP), Extensible Messaging and Presence Protocol (XMPP), File Transfer Protocol (FTP), Secure Shell (SSH), Server Message Block (SMB), etc., for some or all communications between electronic devices 102, 103, 104, 106 and server 110. In other examples, electronic devices 102, 103, 104, 106 may be in communication with one another without communicating with server 110.

In the example of FIG. 1, each electronic device 102, 103, 104, 106 may download applications from server 110 or another of electronic devices 102, 103, 104, 106, in response to a request to install an application. The request to install an application may be received from another device on network 108 (or connected thereto), or may be initiated by the electronic device 102, 103, 104, 106, on which the application will be installed.

In operation, server 110 may provide and process operations for hosting a website that may deliver an application to electronic devices 102, 103, 104, 106. Electronic devices 102, 103, 104, 106 may each establish a communications with server 110, for purposes of downloading applications from the hosted website.

Given than an application is installed on electronic device 104, for example, and the application requests to make a sensitive or restricted API call (e.g., the application requests to obtain the user's location), a permissions system of electronic device 104 requires a way to determine whether the application is allowed to obtain the user's location. To determine whether the application is allowed to access such sensitive or restricted information, the permissions system bases the allowance (or denial) of the sensitive API call on authorship attribution, for example, an author or authoring entity of the application.

In accordance with various aspects, an author or authoring entity of an application can be the individual or entity that developed the application or distributes the application. In some instances, the author or authoring entity may be both the developer and distributer of the application. In other instances, the author or authoring entity of the application may be an entity that provides for or facilitates the distribution of the application.

In certain examples, authorship attribution is based on whether the author of the application has an SSL certificate that has been used to deliver the binary code of the application to electronic device 104. For example, SSL protocol technology may be used to enable two systems to communicate via encrypted data. The receiving system (e.g., the permissions system of electronic device 104) has the ability to certify that the received data was indeed transmitted from the source that is claiming to deliver it.

Similar techniques may be utilized, for example, when a user's device attempts to retrieve web email from a remote server. If the user's device is connected to an non-Internet connected network (e.g., a wireless network at a hotel that block Internet access), the web browser of the user's device may provide an indication that the website to which the user is trying to connect does not look like the website acknowledging the communications (e.g., the user's traffic is being intercepted by the hotel server because the user has not yet paid for wireless access).

In accordance with certain aspects, such security mechanism and similar variations and implementations (e.g., verifying an SSL certificate) can be used to validate that the application code being executed by electronic device 104 came from the server identified as the source of the application code. If the delivered code is not properly signed by the certificate and if the certificate itself is not trusted (e.g., the certificate has not been validated by some other third party that is trusted by the user), then the application will not be allowed make the sensitive or restricted API call. In this regard, if the user indicates that he or she trusts source code received from a source (e.g., a web service provider or service provider), the permissions system of electronic device 104 will allow the application to access the sensitive or restricted APIs based on the identity of the authorized entity that delivered the code.

As a result, as soon as electronic device 104 receives the code associated with an application, the permissions system of electronic device 104 can immediately allow that installed application to access sensitive or restricted APIs without having to go through an additional step of the user validating that he or she trusts that particular application. A user of electronic device 104 can therefore trust sources of applications and need not trust each individual application.

Various techniques for tiered application permissions are further described below with respect to FIGS. 2-6 and continued reference to FIG. 1.

Figure 2:
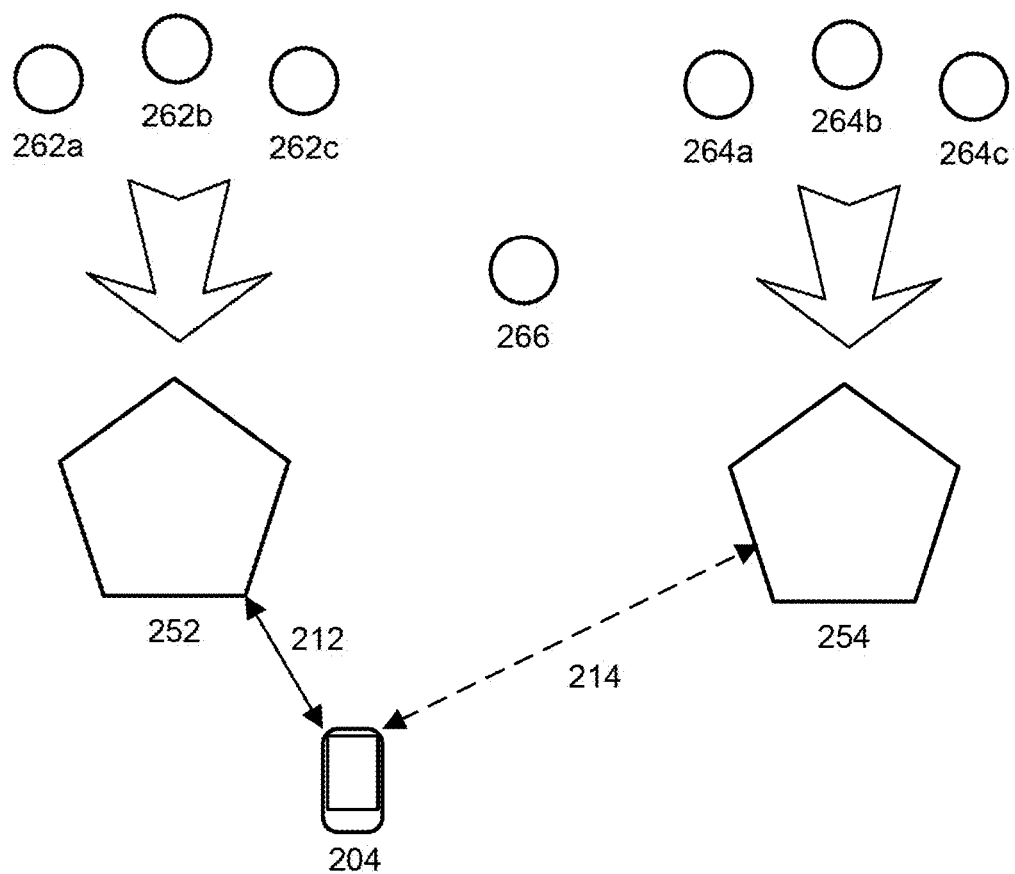
FIG. 2 illustrates examples of authorship trust techniques for granting application permissions in accordance with various aspects of the subject technology.

FIG. 2 illustrates examples of trust techniques for granting permissions. Applications 262a-c, 264a-c, and 266 may be available for installation on mobile device 204. Each of applications 262a-c, 264a-c, and 266 are authored by a different authoring entity in some examples. Mobile device 204 is operable to trust various entities (e.g., a trusted entity) such that applications by authoring entities that are trusted or certified by a trusted entity may be download directly to the mobile device 204 without any user interface interrogatory or additional permissions request by a server (e.g., server 110).

For example, mobile device 204 may include trusted web service provider 252 as a trusted entity and as a trusted connection 212 for facilitating access to and/or downloading applications. However, mobile device 204 has not included service provider 254 as a trusted entity and has an untrusted connection 214 with respect to service provider 254.

It is understood that service provider 254 may be a trusted provided to other devices and could be a trusted entity of mobile device 204 should mobile device 204 elect to include service provider 254 as trusted at some point, for example.

Additionally, each authoring entity that authored applications 262a-c, 264a-c, 266 could be selected and designated as a trusted entity by mobile device 204. However, mobile device has not designated any authoring entity that authored applications 262a-c, 264a-c, 266 as such in the following examples. Trusted web service provider 252, however, expressly trusts and has certified each of the authoring entities of applications 262a-c. For example, mobile device 204 may process a request to install application 262a that requires access to one or more API calls. Mobile device 204 determines the authoring entity of application 262a, and that the authoring entity of application 262a is certified by trusted web service provider 252. Thus, mobile device 204 allows application to be downloaded (e.g., over network 108) and installed without any permissions dialog directed to a user of the mobile device 204 regardless of whether application 262a requires API calls to sensitive or restricted APIs.

Moreover, mobile device 204 may similarly process a request to install application 262b and automatically install application 262b because application 262b is likewise trusted and certified by trusted web service provider 252. If, however, trusted web service provider 252 revokes its trust and certification of 262b, and if application 262b has already been installed by mobile device 204, then any API call by application 262b will likewise be revoked by the mobile device 204. For example, trusted web service provider 252 may send a notification to devices for which it has a trusted connection 212 and/or revoke an SSL certificate issued to the authoring entity of application 262b.

In the example of FIG. 2, service provider 254 expressly trusts and has certified each of the authoring entities of applications 264a-c. However, any trust and certification of authoring entities by service provider 254 is of no consequence to mobile device 204 with respect to automatically downloading and installing an application on mobile device 204. However, the trust and certification of the authoring entities of applications 264a-c may have some relevancy in certain instances and described below.

For example, mobile device 204 may process a request to install application 264c that requires access to one or more API calls. Mobile device 204 determines the authoring entity of application 264c, and that the authoring entity of application 264c is not trusted or certified by any trusted entity of the mobile device 204. Thus, mobile device 204 denies the installation of application 264c that requires one or more API calls, at least initially with regard to trusted automatic download as installation techniques.

However, in some examples, mobile device 204 may receive a request to install application 264c (e.g., a map and driving directions program) that identifies the one or more API calls of application 264c and that identifies multiple entities that certify the authoring entity of application 264c. Thus, device 204 may provide a dialog in a user interface indicating that the one or more API calls of application relate to location information of the mobile device 204 and that service provider 254 (e.g., a well-known service provider) and fifteen other entities (e.g., several of which are deemed highly trustworthy) have certified the authoring entity of application 264c. If a user of device 204 is agreeable to allow such permissions based on the information provided in the dialog, an acknowledgement confirming the received request may be processed and application 264c can be installed on the mobile device 204.

In another example, mobile device 204 may receive a request to install application 266 (e.g., a flashlight program that uses a mobile phone's existing camera flash) that identifies the one or more API calls of application 266 and that identifies several entities that certify the authoring entity of application 266. Thus, device 204 may provide a dialog in a user interface indicating that the one or more API calls of application relate to access of email and browser history data stored on the mobile device 204 and that three entities (e.g., none of which are known to a user of the mobile device 204) have certified the authoring entity of application 264c. Thus, the user of device 204 may not be agreeable to allow such permissions and deny the received request.

Figure 3A:
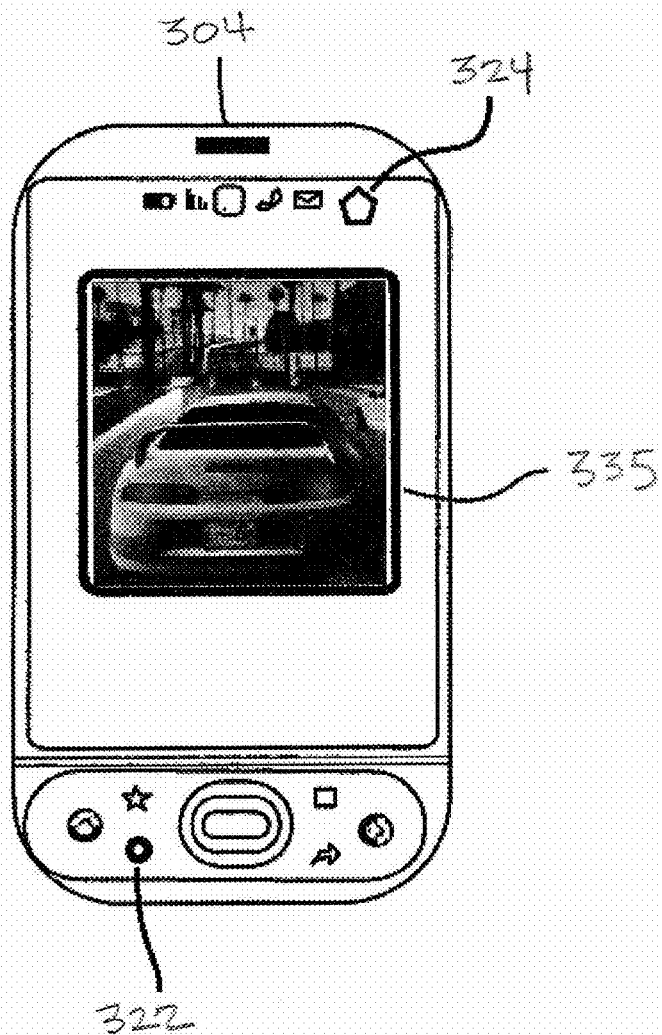
FIGS. 3A and 3B illustrate examples of API usage notification techniques in accordance with various aspects of the subject technology.

FIG. 3A is an example of a mobile device 304 employing API usage notification techniques. In certain examples, mobile device 304 may provide the user with a real-time indication that an API call or other information access request is taking place. The API call can be associated with an API and accessed data on the mobile device 304 or with an API on the mobile device 304 and remotely accessed data, for example. A user of the mobile device 304 may be running an application 335 (e.g., playing a racing game). In some examples, access permissions for the application 335 may have been previously granted and acknowledged in some manner by the user. Certain API calls may be expected during the execution of the application, for example, access to a hard drive to retrieve code associated with the continued execution of the application.

However, a sensitive or restricted API call that is not expected may be triggered by application 335 while the application 335 is running on the mobile device 304. For example, application 335 may invoke an API call associated with the access of financial data on the mobile device 304. In response to the sensitive or restricted API call, mobile device 304 may provide an indication that the sensitive or restricted API call has just occurred.

For example, the indication that an API call has been invoked can be provided by a hardwired indicator light 322 (e.g., an LED, lamp, or the like) on mobile device 304. In this regard, such a hardwired indicator implementation may be virtually impervious to circumvention or tampering attempts by a malicious software application. For example, a malicious software application would not be able to cover or overlay an image on a display screen indication of an sensitive or restricted API call. Alternatively, or in addition, an indication that an API call is being invoked may be provided by an indicator icon 324 on a portion of the display screen of the mobile device 304. Controls and modules related to both indicator light implementation may be included in the device as separate operating system subsystems to further minimize attempts by malicious software applications to circumvent sensitive or restricted API notification techniques.

To alert a user, indicator light 322 and/or indicator icon 324 may illuminate, flash, blink, pulse or the like in various color and durations according to how sensitive the API being accessed is. For example, local storage access related to an application for which application data and code are isolated (e.g., sandboxed), could be shown as a green indicator. However, a more sensitive assess, for example, sharing cookies or other user-related information between applications could be shown as yellow indicator (e.g., certain advertisement systems may perform such task in order to show a user advertisement targeted based on a user's browsing history rather than current context). The indicator light 322 and/or indicator icon 324 could be shown as a red indicator for highly sensitive or restricted access, for example, highly personal information such as, but not limited to, a user's contact list, location, documents, and email.

Similarly, the duration of the indication provided by of the indicator light 322 and/or indicator icon 324 may differ for various sensitivity levels associated with API calls being invoked. For example, a green indicator may be a short blink or pulse, a yellow indicator could be slightly longer blink or pulse (e.g., 500 millisecond), and a red indicator could be long flash (e.g., 1 second) so as to encourage the user of the mobile device 304 to notice when highly sensitive or restricted API calls are being invoked.

It is to be understood, however, that other techniques may be used to visually communicate to a user of the mobile device 304 that a sensitive or restricted API call has been invoked. Moreover, in some implementations, the indication that an API call has been invoked may include a sound (e.g., a chirp, beep, or alarm) or vibration of the mobile device 304. For example, different sounds and durations of the sounds may be utilized depending on the sensitivity of the API call. In some examples, the sounds used for indicating that an API call has been invoked can be unique sounds that are not selectable for use in other system settings of the mobile device 304.

In accordance with certain aspects, an entry related to an API call invoked may be provided to an API access log or similar information access log. In some examples, the API access log can be accessed by as user of the mobile device 304 by tapping on the indicator icon 324. In this regard, the user of the mobile device 304 can be alerted in real-time to the potential threat, investigate the details associated with the sensitive or restricted API access, and take any corrective measures, if necessary.

Figure 3B:
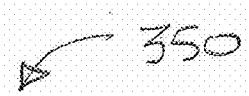

FIG. 3B illustrates an example of an API access log 350. API access log 350 can be a notification log viewable on the display screen of the mobile device 304 that provides only API access notifications. For example, API access log 350 can include a notification header bar 352 that indicates columns for application name, level of sensitivity, details, time, etc., related to API access events. API access log entries 355a-g identify the particulars of the API access events and may be sorted in various manners, for example, based on time of occurrence.

A user of mobile device 304 may inspect the API access log 350, for example, when alerted to an unusual or unexpected API indication by indicator light 322 and/or indicator icon 324. However, the user may review the API access log entries 355a-g at a time more convenient for the user. It is important to note that a high level (e.g., red indictor) API access log entry does not necessarily indicate that any improper API access occurred. Rather, the API notification techniques in accordance with certain aspects may simply alert and inform the user that a specific API call or event is occurring. For example, API access log entry 355d for an API call related to personal information associated with a finance application and API access log entry 355g for an API call related to location information associated with a map application may be entirely expected by the user.

Some low or medium access level API calls, for example, API access log entries 355b, 355e, 355f may be expected by the user. However, other high and medium access level API calls may be cause for concern. For example, as discussed above with respect to the example of access while playing a racing game, a user would likely inquire into the details of API access log entry 355a for an API call related to personal financial information associated with a racing game application.

Additionally, a user may be alerted by indicator light 322 and/or indicator icon 324 and inquire into the details of API access log entry 355c for an API call related to installing a new icon on the user's home screen associated with an operating system library application. For example, certain operating system libraries may install new icons on the user's home screen in order to drive installs of applications that the user hasn't discovered yet. The user may not understand why or how the new application icon for downloading appears on the home screen, or which application or applications are responsibly for such installation activity. The user of mobile device 304 could access the API access log 350 and review the details of API access log entry 355c. The user could then make a decision whether the API call and resulting event were acceptable to the user or remove the application making the API call or remove the application's permission to invoke that specific API call, if possible.

Accordingly, real-time indication of API access and related information access may be communicated along with a degree of sensitivity of the detected API access and specific details such that a user of the mobile device 304 can readily correlate sensitive or restricted API calls to an application being currently executed by the mobile device 304. Moreover, in some implementations, the access levels or classifications associated with the sensitive or restricted API calls are fixed whereby a user cannot modify the sensitivity level given to a particular API or API call. In this regard, a malicious software application cannot attempt to change a high-level access (e.g., red indicator) to a low-level access (e.g., green indicator) classification via settings parameters of user configuration source code, for example.

An example API usage notification process related to the API usage notification techniques described above is further provided. The example API usage notification process may be used in conjunction with other processes and aspects of the present disclosure. Although aspects are described with relation to the examples provided in FIGS. 1-3B, the API usage notification process is not limited to such.

For example, an API call by an application may be detected by a computing device (e.g., electronic device 104, mobile device 204, or mobile device 304). The detected API call may be related to accessing data associated with the computing device. A sensitivity level of the API call may be determined based on the associated data. The sensitivity level of the API call may be determined as high, medium, or low. An indication of the API call based on the determined sensitivity level may be provided by the API usage notification process.

In some examples, the API usage notification process a hardwired indicator (e.g., indicator light 322) on the computing device and/or an indicator icon (e.g., indicator icon 324) on a display screen of the computing device may be activated to provide an indication of the API call. In some examples, the indicator icon can be launched such that an API access log comprising one or more API access entries associated with one or more corresponding API calls is provided, for instance, on the display screen of the computing device.

Figure 4:
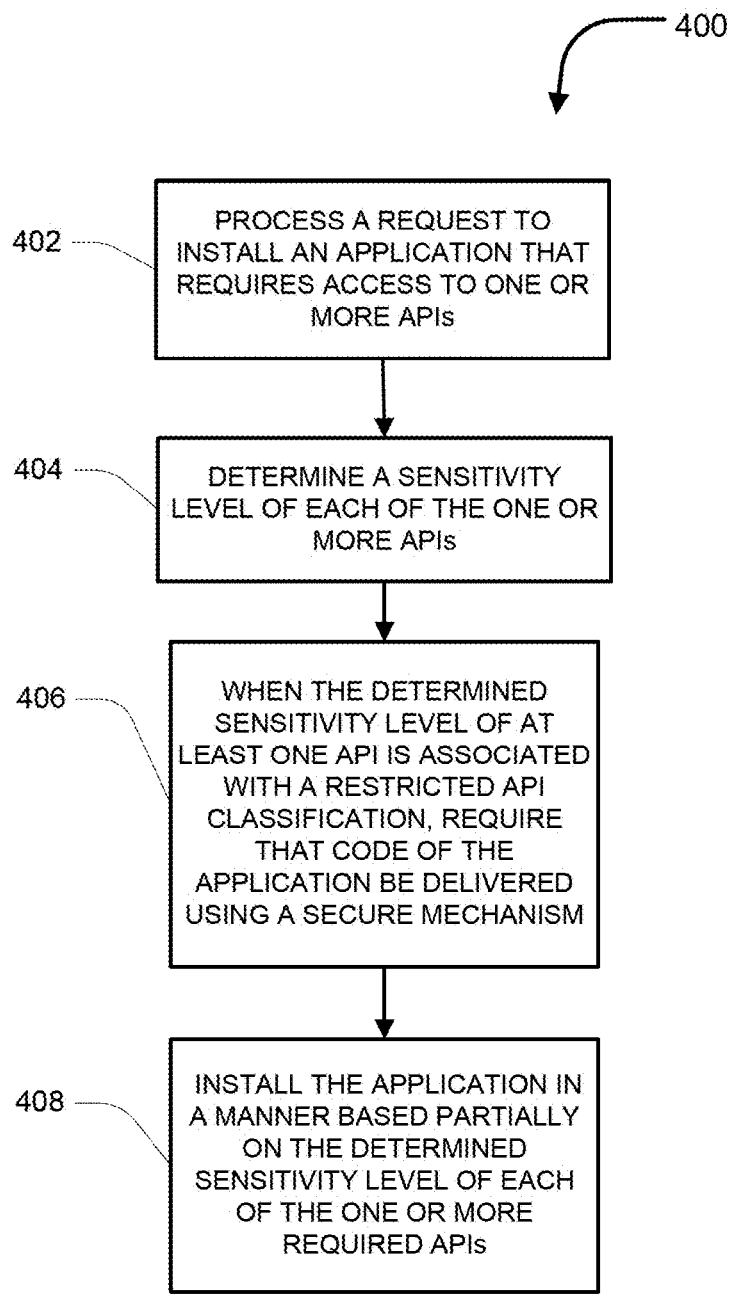
FIG. 4 illustrates an example of a process for installing an application that requires one or more APIs in accordance with various aspects of the subject technology.

FIG. 4 illustrates a flow diagram of an example process related to the installation of an application containing one or more API calls. It is to be understood that the operations in process 400 may be used in conjunction with other processes and aspects of the present disclosure. Although aspects of process 400 are described with relation to the examples provided in FIGS. 1-3B, process 400 is not limited to such.

In block 402, a request (e.g., by electronic device 104, a website hosted by server 110, or another electronic device 102, 103, 105 having connectivity to electronic device 104) may be processed to install an application that requires access to one or more APIs. It is to be understood that the application may include any executable program code such as, but not limited to, code written with various general purpose or interpreted programming languages (e.g., Java, C++, JavaScript, Visual Basic, etc.).

In block 404, the sensitivity level of the one or more APIs may be determined. For example, a device (e.g., electronic device 104, mobile device 204, or mobile device 304) may determine the sensitivity level of each of the one or more APIs for which access is required by the application to be installed. It may be determined that all of the APIs required by the application requesting to be installed on the device may be associated with harmless APIs, some of the required APIs may be associated with harmless APIs and some may be associated with restricted APIs, or all of the required APIs may be associated with restricted APIs. In some examples, restricted (or sensitive) API classifications may include APIs that share a user's contact list, the user's location, the user's email, the user's cookies, and/or the user's documents or files stored on the device or accessible by the device.

Other examples involving restricted (or sensitive) API classifications may include APIs associated with control of a user's entire screen of the device (e.g., full screen mode), accessing a microphone on the device, accessing a speaker on the device, accessing a camera on the device, acquiring information as to whether or not a face can be detected by either a forward facing or rearward facing camera on the device, acquiring an IP address assigned to the device, acquiring the user's email address, acquiring the user's avatar (e.g., a photograph or likeness of the user), acquiring the user's browsing or web search history, acquiring a configuration of the user's home screen on the device (e.g., information pertaining to what icons exist and where the icons are positioned on the home screen), acquiring a list of applications that the user has installed on the device, acquiring usage frequency and history of applications that the user has installed on the device, acquiring an amount of battery life remaining on the device, acquiring information regarding detectable Bluetooth beacons of other user devices or WiFi beacons in the vicinity of the user's device (e.g., information as a proxy for the user's present location), acquiring information regarding a presence or absence of light around the device, acquiring a temperature of the device (e.g., information which may indicate a placement of the device on the user's person), acquiring a speed at which the device is moving, acquiring an orientation of the device, acquiring a status of whether the device is currently being used for a telephone call, acquiring a call history of the device, acquiring a ringtone of the device, and acquiring information regarding how long the device has been in an idle state as measured by at least one of activation of the display, user input to the device, or movement of the device.

It is to be appreciated that personally identifying information may potentially be determined by an application having permissions to APIs associated with various sensors on the device, particularly when such acquired sensor information is taken in combination with other information regarding the user of the device.

In block 406, when the determined sensitivity level of at least one API of the one or more required APIs is associated with a restricted API classification, requiring that code of the application containing the one or more API calls to be delivered by the website using a secure mechanism. In some implementations, secure sockets layer (SSL) protocol may be included in the secure mechanism related to the delivery of the code. Other secure transfer techniques for delivering code are contemplated for use in various implementations.

In block 408, the application that requires the one or more API calls may be installed on the device (e.g., by downloaded from server 110 hosting the website). In some implementations, the manner in which the application is installed on the device can be based on the determined sensitivity level of each of the one or more required APIs. For example, the code of the application containing the one or more APIs may be delivered using a secured mechanism as may be required when the determined sensitivity level of at least one API of the one or more required APIs is associated with a restricted API classification. However, in some examples, the code of the application containing the one or more required APIs may be delivered in an unsecured manner when all of the required APIs contained in the application are classified as low or harmless.

Figure 5:
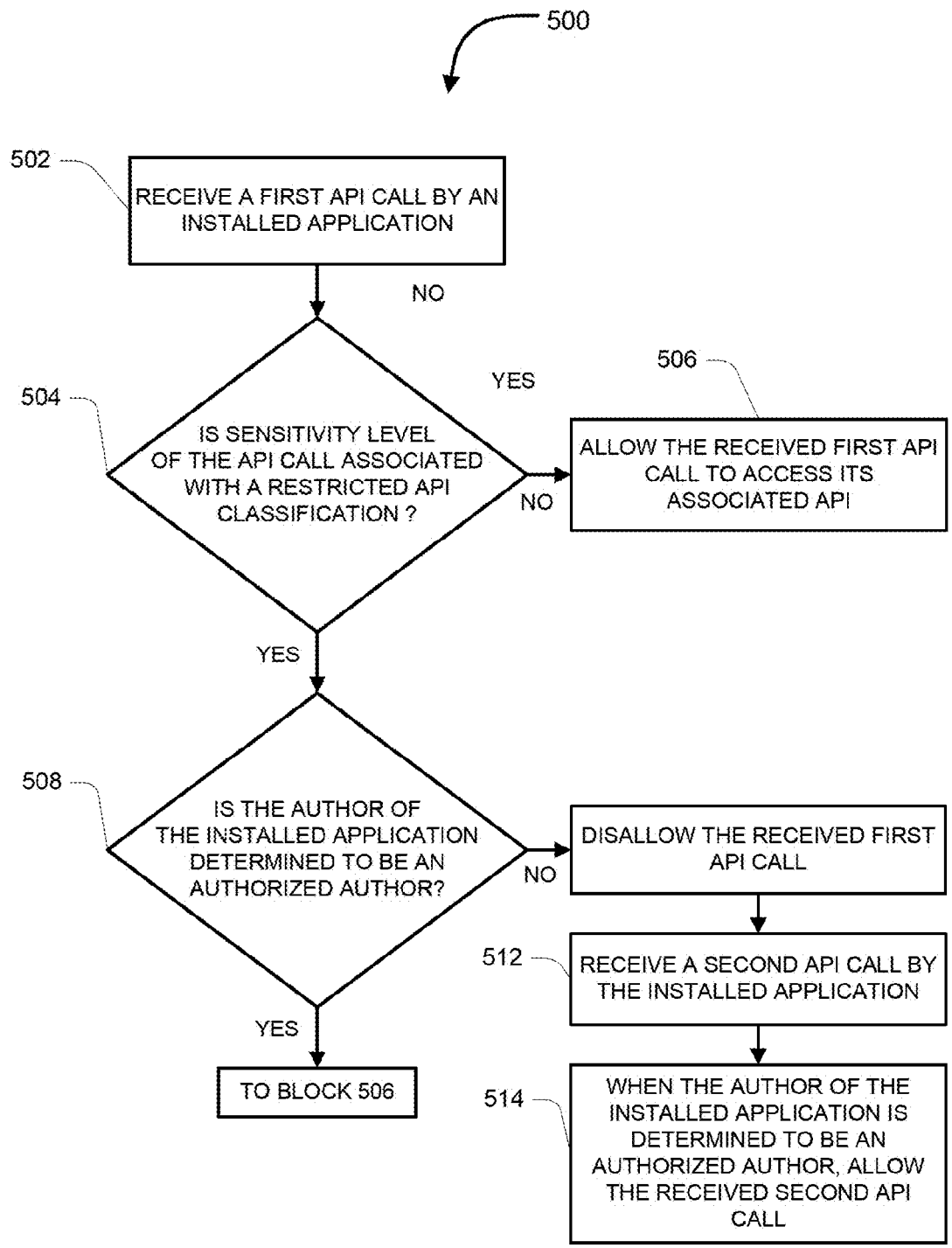
FIG. 5 illustrates an example of a process for restricting API calls by an installed application in accordance with various aspects of the subject technology.

Referring to FIG. 5, an example process 500 for determining whether to allow an API call is illustrated. It is to be understood that the operations in process 500 may be used in conjunction with other processes and aspects of the present disclosure. Although aspects of process 500 are described with relation to examples provided in of FIGS. 1-3B, process 500 is not limited to such.

In block 502, a device (e.g., electronic device 104, mobile device 204, or mobile device 304) may receive a first API call by an installed application. For example, an API calling module (e.g., an application program or a device driver) may make the first API call using an API, which may specify one or more functions, data structures, protocols, formats and/or features of an API implementing module (e.g., an operating system or an application program) residing on the device.

In certain examples, the application making the first API call may have been installed using the operations described in process 400. However, the application may have been installed on the device by other manners (e.g., installed by flash drive, CD-ROM, etc., or installed by activating a resident code on electronic device 104 such as a preinstalled application) or installed without process 400. In any such scenario, the device may process the received first API call by the installed application.

In decision block 504, a sensitivity level of the received first API call may be determined by the device. For example, a permissions system of the device may determine that the first API call shares the location of the device with a remote application (e.g., an application across network 108 residing on server 110). In some implementations, sharing the location of the device is deemed to be a restricted API classification.

In block 506, when the determined sensitivity level of an API call is not associated with a restricted API classification, the permissions system of device may allow the API call. As such, in certain implementations, the permissions system of the device may allow any harmless API call regardless of whether an author of the installed application is determined to be an authorized author. In other implementations, however, permissions system of the device may determine whether an author of the installed application is determined to be an authorized author even when the determined sensitivity level of an API call is not associated with the restricted API classification (e.g., requiring that an author be an authorized user for all installed applications that require access to one or more APIs).

When the determined sensitivity level of the received first API call is associated with the restricted API classification, the permissions system of the device may determine whether an author of the installed application is determined to be an authorized author (decision block 508). For example, whether the author of the installed application is determined to be an authorized author may be determined by determining whether a certificate associated with a delivery of code during the installation of the application is owned by a trusted entity or has been validated by a trusted entity. A trusted entity may be a corporate entity (e.g., a web search provider, a software developer, etc. associated with server 110) or an individual user (e.g., a user associated with electronic devices 102, 103) in various examples and implementations of process 500. The concept of trusted entities and application permissions is described in detail above with respect to FIG. 2.

In some implementations, the certificate associated with the delivery of code may be a secure sockets layer (SSL) certificate. For example, authorizing an author of an application can be based on having an SSL certificate that was used to deliver binary code to the device during the process of installing the application. It is to be appreciated that an advantage of utilizing SSL techniques is that such techniques are not seen to impose constraints on websites delivering applications in such a manner as SSL protocol and related delivery mechanisms may be used in some situations involving brokerage transactions, for example.

When the author of the installed application is determined to be an authorized author, the received first API call that has been determined to be associated with a restricted API may be allowed (block 506) by the permissions system of the device. However, when the author of the application is not determined to be an authorized author, the received first API call may be disallowed or denied access to its associated API (block 510).

In block 512, a second API call by the installed application may be received. Accordingly, when the author of the installed application is determined to be an authorized author, the received second API call may be allowed access to its associated API (block 514). Similarly, once the permissions system of the device has determined that the author of the application is an authorized author, any subsequent API call by that application may be automatically allowed by the permissions system.

Figure 6:
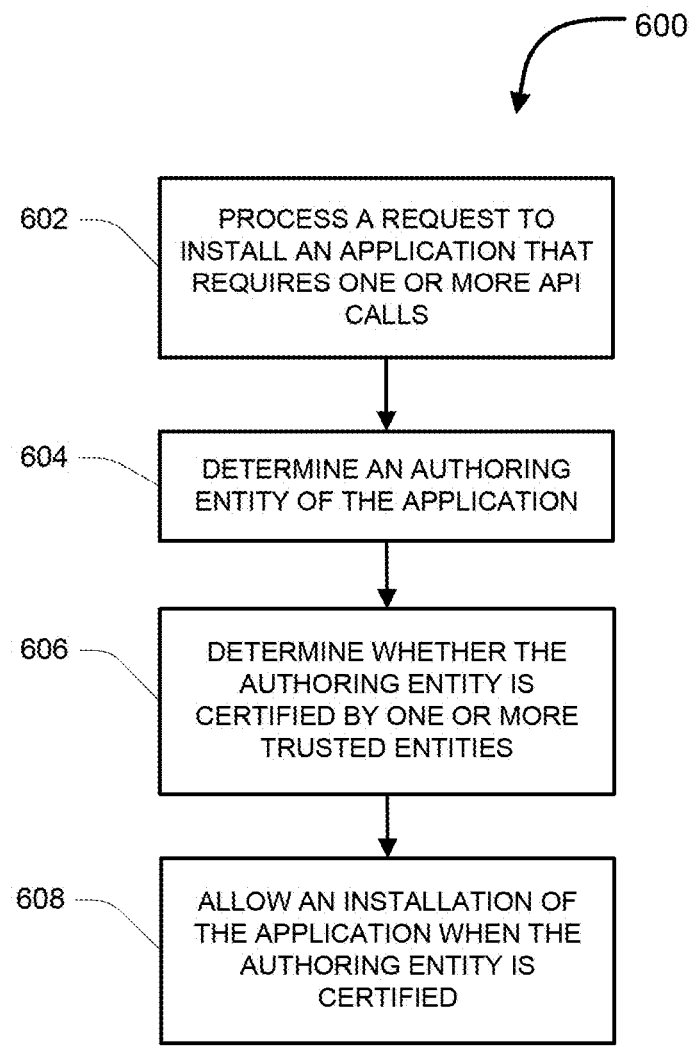
FIG. 6 illustrates an example of a process related to a request to install an application that requires one or more API calls in accordance with various aspects of the subject technology.

FIG. 6 is a flow diagram illustrating an example process 600 for determining whether to allow an application that requires one or more API calls to be installed on a device based on certification of the author of the application by one or more trusted entities. It is to be understood that the operations in process 600 may be used in conjunction with other processes and aspects of the present disclosure. Although process 600 is described with relation to system of FIG. 1-3B, process 600 is not limited to such.

In block 602, a device (e.g., electronic device 104, mobile device 204, or mobile device 304) may process a request to install an application that requires one or more API calls by the application to be installed. For example, a user of the device may wish to initiate a download of an application (e.g., application 262a) from a remote server. However, the user may not be knowledgeable of who the author of the application is or the author's credentials, for example.

Accordingly, an authoring entity of the application may be determined (block 604). For example, the device may determine an authoring entity of the application by receiving an indication from the remote server. The device may also determine an authoring entity of the application by receiving an indication from a trusted entity (e.g., trusted web search provider entity 252).

In block 606, the device may determine whether the authoring entity is certified by one or more trusted entities (e.g., trusted web search provider 252). In certain implementations, the one or more trusted entities are deemed trusted by the user of the device. For example, the device may include a list of trusted entities including, but not limited to, web search providers, service providers, software developers, and other entities that may facilitate the distribution of applications.

In some examples, the determination whether the authoring entity is determined to be certified by one or more trusted entities may be based on a security certificate received by the one or more trusted entities associated with the delivery of the code of the application by the authoring entity. In some implementations, the security certificate is a secure sockets layer (SSL) certificate. However, other techniques for providing security certificates or the like are contemplated.

Moreover, the trust provided by the one or more trusted entities in example certification processes may be time barred in accordance with certain aspects. For example, determining whether the authoring entity is certified by one or more trusted entities may include determining whether the certification of the authoring entity by the one or more trusted entity has exceeded an expiry period. In some implementations, the expiry period of the certification is one year; however, in other implementations, a thirty-day expiry period of the certification may be used, for example.

Similarly, the device may receive a trust level rating associated with a first trusted entity of the one or more trusted entities. The trust level rating may be based on a number of security violations caused by applications by authoring entities trusted by the first trusted entity, for example. In this regard, the device may decide to remove the first trusted entity as a trusted entity of the device if the number of security violations (and or type/severity of the violations) is unacceptable to the device (e.g., an associated threshold in device settings) or the user of the device (e.g., upon review of a dialog screen). It is understood that in certain implementations, the trust level rating is generated by a neutral third party.

In block 608, an installation of the application that requires one or more API calls may be allowed or permitted by the device when the authoring entity is certified by at least one trusted entity. However, if it is determined that the application that requires one or more API calls is not certified by any trusted entity, then installation of the application may be denied in accordance with some examples.

In accordance with some aspects, a transitive trust technique may be employed for allowing installation of an application on a device. For example, a request by a remote server regarding an application (e.g., application 264c or application 266) of an authoring entity may be received by the device. In some examples, the request by the remote server may originate from a third party (e.g. a trusted entity of the device that has not certified the authoring entity, but may act as an intermediary). However, in other examples the request by the remote server may originate directly from the authoring entity, and may be sent in a secure manner (e.g., via an SSL connection) to the device. The request may identify the one or more API calls or required APIs of the application and at least one transitive trust entity that certifies the authoring entity of the application.

The at least one transitive trust entity (e.g. service provider 254) may be an entity that certifies and trusts the authoring entity of the application (e.g., application 264c), but is not identified as a trusted entity of the device. For example, the device may not have established a trusted relationship with the at least one transitive trust entity because the user of the device may be unaware of the existence of that particular entity (or entities) or may choose to not allow every application authorized by that particular entity (or entities) without an explicit request.

For example, if the device had identified the least one transitive trust entity as a trusted entity, the process of the receiving an explicit request by the remote server would not be necessary in certain implementations (e.g., if service provider 254 were a trusted entity of the device, then application 264c, which is authored by an authoring entity that is trusted by service provider 254, would be allowed as described in block 606 without requiring the request for installation). Accordingly, if the explicit request identifying the one or more API calls or required APIs of the application and at least one transitive trust entity that certifies the authoring entity of the application is acknowledged by the device (e.g., approved by the user), the device will allow or permit installation of the application through this transitive trust technique.

FIG. 7 conceptually illustrates an electronic system with which some implementations of the subject technology are implemented. Electronic system 700 can be a server, computer, phone, PDA, a tablet computer, a television with one or more processors embedded therein or coupled thereto, or generally any electronic device. Such an electronic system includes various types of computer readable media and interfaces for various other types of computer readable media. Electronic system 700 includes a bus 708, processing unit(s) 712, a system memory 704, a read-only memory (ROM) 710, a permanent storage device 702, an input device interface 714, an output device interface 706, and a network interface 716.

Bus 708 collectively represents all system, peripheral, and chipset buses that communicatively connect the numerous internal devices of electronic system 700. For instance, bus 708 communicatively connects processing unit(s) 712 with ROM 710, system memory 704, and permanent storage device 702.

From these various memory units, processing unit(s) 712 retrieves instructions to execute and data to process in order to execute the processes of the subject disclosure. The processing unit(s) can be a single processor or a multi-core processor in different implementations.

ROM 710 stores static data and instructions that are needed by processing unit(s) 712 and other modules of the electronic system. Permanent storage device 702, on the other hand, is a read-and-write memory device. This device is a non-volatile memory unit that stores instructions and data even when electronic system 700 is off. Some implementations of the subject disclosure use a mass-storage device (such as a magnetic or optical disk and its corresponding disk drive) as permanent storage device 702.

Other implementations use a removable storage device (such as a floppy disk, flash drive, and its corresponding disk drive) as permanent storage device 702. Like permanent storage device 702, system memory 704 is a read-and-write memory device. However, unlike storage device 702, system memory 704 is a volatile read-and-write memory, such as a random access memory. System memory 704 stores some of the instructions and data that the processor needs at runtime. In some implementations, the processes of the subject disclosure are stored in system memory 704, permanent storage device 702, or ROM 710. For example, the various memory units may include instructions for operations related to application permissions and API access notification techniques in accordance with some implementations of the subject technology. From these various memory units, processing unit(s) 712 retrieves instructions to execute and data to process in order to execute the processes of some implementations.

Bus 708 also connects to input and output device interfaces 714 and 706. Input device interface 714 enables the user to communicate information and select commands to the electronic system. Input devices used with input device interface 714 include, for example, alphanumeric keyboards and pointing devices (also called "cursor control devices"). Output device interfaces 706 enables, for example, the display of images generated by the electronic system 700. Output devices used with output device interface 706 include, for example, printers and display devices, such as cathode ray tubes (CRT) or liquid crystal displays (LCD). Some implementations include devices such as a touchscreen that functions as both input and output devices.

As shown in FIG. 7, bus 708 also couples electronic system 700 to a network (not shown) through a network interface 716. In this manner, the computer can be a part of a network of computers (such as a local area network ("LAN"), a wide area network ("WAN"), or an Intranet, or a network of networks, such as the Internet. Any or all components of electronic system 700 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

For example, the instructions for performing various operations may be stored in the memory units and implemented in one or more computer program products, for example, one or more modules of computer program instructions encoded on a computer readable medium for execution by, or to control the operation of, the electronic system 700, and according to any method known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python).

Instructions for performing various operations may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Various memory units may also be used for storing temporary variable or other intermediate information during execution of instructions to be executed by processing unit(s) 712.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The term website, as used herein, may include any aspect of a website, including one or more web pages, one or more servers used to host or store web related content, and the like. Accordingly, the term website may be used interchangeably with the terms web page and server.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

What is claimed is:

1. A system comprising:
one or more processors; and
a memory including instructions that, when executed by the one or more processors, cause the one or more processors to:
detect an API call by an application, the API call for accessing data associated with a computing device,
determine a sensitivity level of the API call based on the associated data, and
provide an indication of the API call based on the determined sensitivity level, the providing the indication comprising activating a hardwired indicator on the computing device or activating an indicator icon on a display screen of the computing device.

2. The system of claim 1, wherein the instructions that, when executed by the one or more processors, cause the one or more processors to determine the sensitivity level of the API call based on the associated data, further cause the one or one or more processors to determine whether the sensitivity level of the API call is at least one of high, medium, or low.

3. The system of claim 1, wherein the instructions that, when executed by the one or more processors, further cause the one or more processors to:
- detecting whether the indicator icon has been launched; and
- in response to launching the indicator icon, providing an API access log comprising one or more API access entries associated with one or more corresponding API calls.

4. The system of claim 1, wherein the instructions that, when executed by the one or more processors, cause the one or more processors to provide the indication of the API call based on the determined sensitivity level, further cause the one or one or more processors to provide an entry into an API access log.

5. A non-transitory machine-readable medium comprising instructions stored therein, which when executed by a machine, cause the machine to perform operations, the machine-readable medium comprising:
- instructions for detecting an API call by an application, the API call for accessing data associated with a computing device;
- instructions for determining a sensitivity level of the API call based on the associated data; and
- instructions for providing an indication of the API call based on the determined sensitivity level, the providing the indication comprising activating a hardwired indicator on the computing device or activating an indicator icon on a display screen of the computing device.

6. The non-transitory machine-readable medium of claim 5, wherein the instructions for determining the sensitivity level of the API call based on the associated data comprise instructions for determining whether the sensitivity level of the API call is at least one of high, medium, or low.

7. The non-transitory machine-readable medium of claim 5, further comprising:
- instructions for detecting whether the indicator icon has been launched; and
- in response to launching the indicator icon, instructions for providing an API access log comprising one or more API access entries associated with one or more corresponding API calls.

8. The non-transitory machine-readable medium of claim 5, wherein the instructions for providing the indication of the API call based on the determined sensitivity level comprise instructions for providing an entry into an API access log.

* * * * *